May 2, 1961 F. W. READ 2,982,309
TIME CONTROLLED VALVES
Filed July 26, 1954 2 Sheets-Sheet 1

INVENTOR.
FRANK W. READ
BY
LeRoy J. Leishman
Agent

May 2, 1961 F. W. READ 2,982,309
TIME CONTROLLED VALVES
Filed July 26, 1954 2 Sheets-Sheet 2

INVENTOR.
FRANK W. READ
BY
LeRoy J. Leishman
Agent

United States Patent Office 2,982,309
Patented May 2, 1961

2,982,309

TIME CONTROLLED VALVES

Frank W. Read, 25 Kensington Ave., Salt Lake City, Utah

Filed July 26, 1954, Ser. No. 445,700

5 Claims. (Cl. 137—624.22)

The invention herein described pertains to water softening equipment and more particularly to a valve for use in connection with a tank wherein the water is softened.

One type of apparatus for softening water utilizes a tank containing the water softening materials, and the hard water from the mains enters the tank from the bottom and the softened water leaves from the top. The water softening chemicals become depleted after prolonged use, and it is then necessary to detour or shunt the main water supply around the tank until a fresh supply of softening salts has been added and allowed to permeate and regenerate the materials remaining in the tank. During this regeneration period, it is advisable that a small amount of water flow through these materials in a direction opposite from that of the normal flow—that is, from top to bottom—until all the contents of the tank have been throughly permeated with the additional chemicals. After the materials in the tank have thus been renewed, the normal flow of water must be restored.

The procedure that must be followed to rejuvenate the water softener accordingly includes the following steps: first, the valve between the water mains and the bottom of the tank must be closed and the incoming water diverted directly into the household pipes; second, a new supply of chemicals must be placed in the tank from the top; third, a small flow of water must be established through the tank in a reverse direction and a suitable drain must be opened to permit the water of the reverse flow to escape; fourth, after a sufficient period of time has elapsed to permit the chemicals within the tank to be regenerated, the drain must be closed, the flow of water into the top of the tank turned off, and the normal flow of water reestablished through the tank from the bottom to the top and thence into the household pipes.

Still other steps are required in connection with the rejuvenation process, but it will readily be seen that even the steps already specifically enumerated are sufficient to require the attention of someone familiar with the process, and that the presence of such person for operating the necessary valves is needed both at the beginning of the rejuvenation period and after. If the rejuvenating materials are to be placed in the tank by a serviceman, he must of course remain on the premises during the rejuvenation period or return immediately thereafter to reestablish the normal flow of water through the tank.

One object of my invention is the provision of automatic means whereby the operation of a single control, after the flow of water into the tank has been momentarily stopped, will operate all of the valves necessary to prepare the tank for rejuvenation and to establish the necessary reverse flow into the tank and thence into the drain.

Inasmuch as an automatic device of the type herein described would normally be difficult to operate because of the opposing pressure of the water, another object of my invention is the provision of simple means to effect the release of such pressure just prior to the operation of the control for the aforementioned purposes.

An additional object is to provide mechanism whereby the said opposing pressure will automatically be released in response to the operation of a valve for shutting off the flow of water into the main housing which forms a part of various embodiments of my invention.

In order to eliminate the necessity of the presence of an attendant at the tank after the rejuvenation period, another object of my invention is the provision of automatic means for shutting off the reverse flow of water from the top toward the bottom of the tank, for closing the connection with the drain, and for restoring the normal flow of water through the tank after the aforementioned period.

A further object of my invention is the provision of time-controlled instrumentalities for operating the automatic means referred to in the last paragraph.

Another object is the provision of means for automatically locking a control member in one operative position against water pressure tending to move the control to a different operative position.

Yet another object is the provision of a cam-operated device for unlocking the control member mentioned in the last paragraph so that said control will be moved from one operative position to another under the pressure of the water.

Still other objects will appear as the specification proceeds.

In the drawings:

In Fig. 7 the second valve has opened in response to the closing of the first valve.

Figure 1:
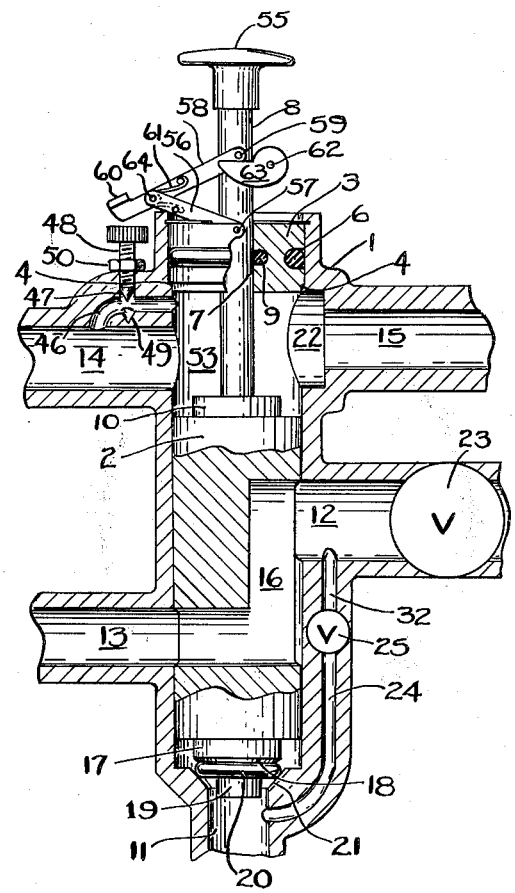
Fig. 1 is a longitudinal section through one embodiment of my invention, showing the parts thereof in the positions in which they are disposed during the normal flow of water into and from the rejuvenated tank.

In the embodiment of my invention that I presently prefer, the main housing 1, which may conveniently be a casting, has a central longitudinal bore in which slides a specially constructed plunger 2. The top of the housing is provided with a circular opening of greater diameter than the main bore so that a sleeve or bearing 3 may fit against the annular shoulder 4. The upper end portion of the top opening is provided with an internal annular groove to receive a retaining ring or C-washer 5 to hold the sleeve 3 in sandwiched position between the ring 5 and the shoulder 4. A resilient O-ring 6 fits in an annular recess in the periphery of the sleeve 3 to produce an effective seal between the sleeve and the inner walls of the housing. The sleeve or bearing 3 has a central aperture 7 which serves as a longitudinal bearing for the rod 8, which is concentrically attached to the main body of the plunger 2 by any appropriate means. The rod 8 and the plunger 2 may, in fact, be formed of one piece. The bearing or sleeve 3 is provided with an internal annular groove to receive a second O-ring to provide a seal between the sleeve 3 and the rod 8. The main body of the piston 2 has a reduced upper end 10, the purpose of which will later be apparent. The bottom of the housing 1 has an opening 11 therein which may conveniently be co-axial with the main bore of the housing. The opening or port 11 is normally connected to a drain. The housing has four main ports or passageways 12, 13, 14 and 15 therein whereby water may flow into and out of the central recess or bore. The passageways or ports 12 and 13 are preferably off-set with respect to each other in the manner shown in the figures.

The piston 2 is provided with a cavity 16 having a generally L-shaped configuration so that the extreme end portions of the cavity may substantially register with the ports or passageways 12 and 13 respectively when the piston 2 is in the lower position illustrated in Fig. 1.

Figure 2:
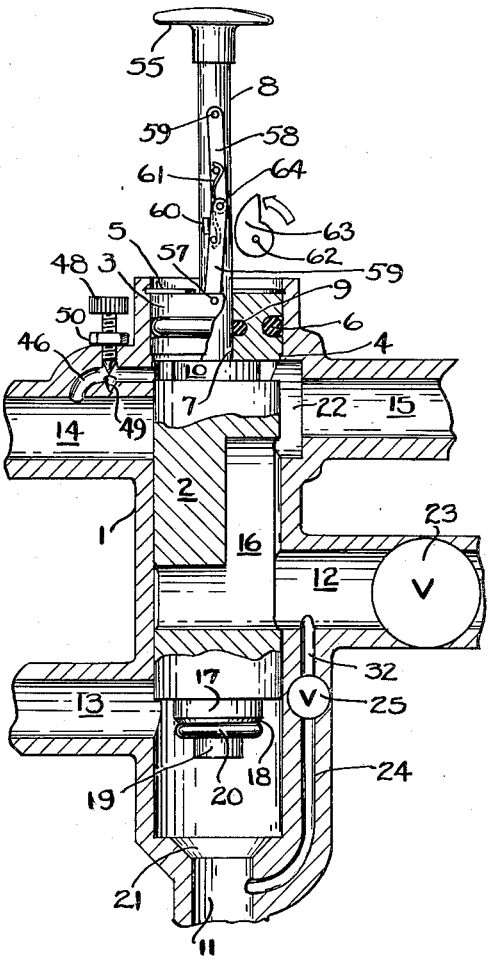
Fig. 2 is also a longitudinal section through the device of Fig. 1, but showing the parts thereof in the positions which they occupy during the rejuvenation period.
Figures 3, 4:
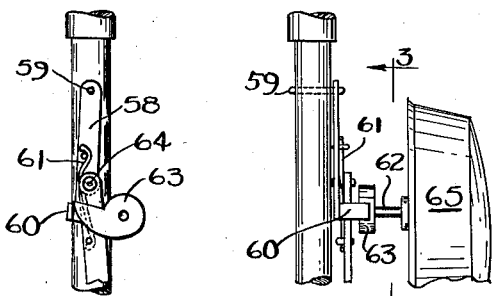
Fig. 3 shows a portion of the timing control mechanism just before the normal flow of water has been restored after the rejuvenation period. This figure is a section taken on line 3—3 of Fig. 4.
Fig. 4 is a side view of a portion of an interval timer and the parts interposed between the timer and the control of the device of Figs. 1 and 2 for causing such control to be moved automatically from one position to another after the lapse of a pre-determined interval.

The main body of the plunger 2 is sufficiently short to be disposed below the ports 14 and 15 when the plunger is in the lower position shown in Fig. 1. It will thus be seen that water may flow readily between the ports or passageways 14 and 15 when the plunger is in this lower position. The L-shaped recess 16 is so proportioned and disposed within the body of the plunger 2 that when the plunger is in its uppermost position, as illustrated in Fig. 2, the horizontal arm of the recess will be generally aligned with the port or passageway 12, and the upper end of the recess will communicate with the enlarged inner portion 22 of port 15 that is interposed between the main part of the passageway 15 and the central bore or recess in which the plunger moves. In the uppermost position of the plunger shown in Fig. 2, it will be noted that the left end of the lower arm of the recess 16 lies considerably above the port or passageway 13, thus preventing any flow between the cavity 16 and port 13. In the uppermost position of the plunger, however, the main body of the plunger is disposed above the passageway 13, thus permitting communication between the lower portion of the circular bore or recess and this passageway.

The plunger 2 has a reduced portion 17 at its lower end as well as the aforementioned reduced portion 10 at the upper end. The lower reduced portion 17 has a tapered section 18 which joins a further reduced portion 19 at the extreme end of the plunger. The tapered section between portions 17 and 19 has a peripheral recess into which nests a resilient O-ring 20. This O-ring provides a seal between the piston and the sloping edges 21 of the upper portion of the drain port 11.

Figure 5:
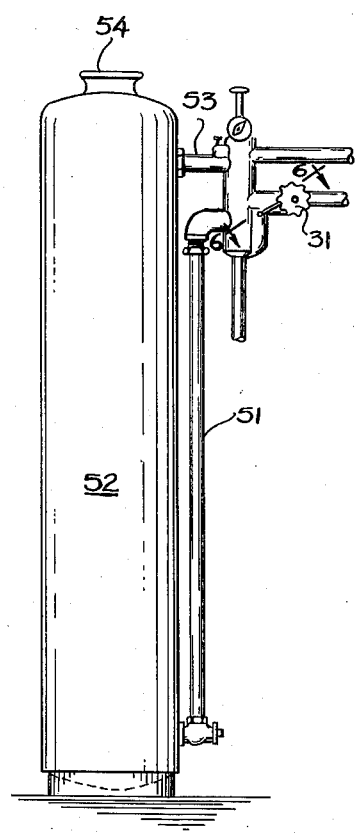
Fig. 5 shows a water softening tank with the device of Figs. 1 and 2 connected thereto.
Figure 6:
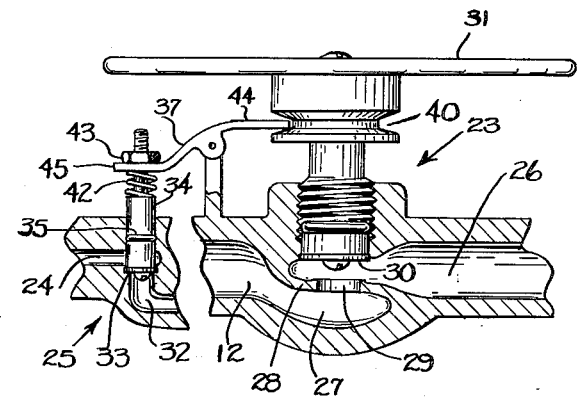
Fig. 6 is a section on line 6—6 of Fig. 5 showing the mechanism whereby the opening of a first valve effects the closing of a second.
Figure 7:
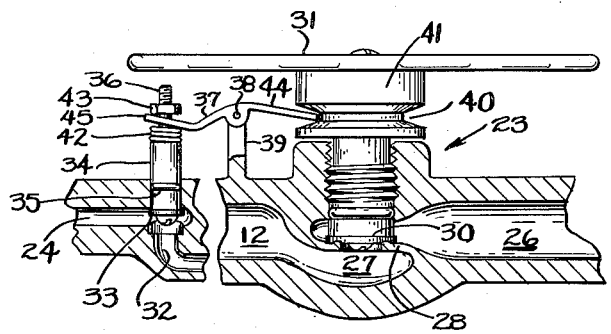
Fig. 7 is also a section taken on line 6—6 of Fig. 5, but showing the movable parts in operative positions that are different from those shown in Fig. 6.

The passageway 12 is opened and closed by a valve 23. At certain times during the operation of my device, it is necessary that this inlet port communicate with the drain port 11. Such communication is effected through the interconnecting ducts 24 and 32 which open respectively into ports 11 and 12. Duct 24 joins the drain port 11 at a point below the seat for the sealing O-ring 20 on the lower end of the plunger. A second valve 25 controls the flow of water through the passageway provided by these interconnecting ducts. As will be evident when the operation of my combination valve and timer is explained, it is desirable that valve 25 open in response to the closing of valve 23 and that valve 25 close in response to the opening of valve 23. These valves may, however, be independently opened or closed by manual means, but the aforementioned automatic interconnection is desirable. A suitable mechanism for effecting such interconnection is shown in Figs. 6 and 7. Fig. 6, as mentioned in the brief description of the figures, is substantially a section taken on line 6—6 of Fig. 5. The chamber 26 may be considered as being connected with the incoming water mains and the chamber 27 with the passageway 12. The wall 28 between these two chambers is provided with a circular opening 29, Fig. 6, against which the resilient washer 30 rests when valve 23 is in the closed position shown in Fig. 7. The flow of the incoming water from chamber 26 to chamber 27 is thus controlled by generally conventional means. When the knob 31 is rotated counter-clockwise to open the valve, the washer 30 will move upward toward the fully open position shown in Fig. 6.

The ducts 24 and 32 come together at right angles as shown in Figs. 6 and 7. The portion of duct 32 that immediately joins duct 24 is recessed as shown in Fig. 7 in order to provide a seat for the washer 33 on the lower end of the small plunger 34. This plunger is rectilinearly movable in a suitable hole in the casting and a slidable seal is effected by means of the O-ring 35. The upper end of the small plunger 34 has a reduced threaded portion 36 that extends through a slot in the rocker 37. This rocker is pivoted on a pin 38 that extends through a bracket 39 which is integral with the main housing. The end of the rocker 37 that is opposed to the slotted end knob 31. A compression spring 42 surrounds the portion of the threaded end 36 of the plunger 34 that lies between the shoulder of the plunger and the slotted end of the rocker 37, and a nut 43 is so positioned on the reduced portion 36 that it remains in contact with the slotted end of the rocker without affecting the normal angular movement of the latter. In Fig. 7, it will be observed that the opening between chambers 26 and 27 is closed, but that the duct 32 is in free communication with the duct 24. In Fig. 6, this situation is reverse, the washer 30 being free from engagement with its seat above the opening 29 between the chambers 26 and 27 while washer 33 has closed the opening between duct 32 and duct 24. As the annular groove 40 moves upward in response to the counterclockwise movement of knob 31, the right end 44 of rocker 37 moves upward, forcing the slotted opposite end of the rocker in a downward direction. When the groove 40 moves downward in response to the clockwise movement of the knob 31, the plunger 34 is caused to move upward. It will thus be clear that the closing of valve 23 by means of knob 31 effects the opening of valve 25 through the interconnecting rocker 37, and that the opening of valve 23 through the counter-clockwise movement of knob 31 will automatically close valve 25 as a result of the consequent downward movement of the plunger 34.

When the main operating plunger or piston 2 of my device is in the operative position shown in Fig. 2, it is necessary that a small stream of water flow from the main recess or bore within the housing to the passageway 14. This is effected through duct 46. The flow through this duct is adjustable by means of the needle valve provided by the conical recess 49 and the tapered end 47 of the thumb screw 48. When this screw is turned to the right, the tapered end will ultimately seat in the conical recess 49, and the main body of the screw will substantially block the duct 46. The thumb screw 48 may of course be adjusted for any desired rate of flow through this duct, and the screw may be locked in adjusted position by means of the lock nut 50.

The flow of water through the various ports and ducts of my device may be explained without reference to the timing mechanism that initiates the return of the plunger from the uppermost position shown in Fig. 2 to its lowermost position shown in Fig. 1. The operation of the timing mechanism will be explained after the flow of water through the structure for different positions of the piston 2 have first been described.

As before mentioned, the positions of the various parts shown in Fig. 1 are those that prevail when the water from the incoming mains flows through the valve housing into the bottom of the water softening tank and out the top of the tank and through the valve structure into the water pipes that carry the softened water to the places where it is to be used. When the valve 23 is open, the incoming water proceeds from chamber 26, Fig. 6, through the aperture 29 into chamber 27 and thence into the passageway 12. When the main piston 2 is in its lowermost position, as shown in Fig. 1, the water flows from port 12 into the vertical arm of the cavity 16 and then through the horizontal arm of this cavity into the port 13. This port is connected by any appropriate means, such as by the pipe 51, Fig. 5, with the bottom of the water softening tank 52. The softened water from this tank flows through any suitable course such as pipe 53, Fig. 5, to the passageway or port 14, Fig. 1. When the plunger is in the position shown in this figure, the water flows through port 14 into the central bore 53 and across the upper end of the plunger and thence into the outlet port 15, whence the water flows to the various places of use.

When the chemicals in the water softening tank 52 are to be rejuvenated, the handwheel or grip 31 of the valve 23 is turned clockwise, or to the right, to move the valve from the open position shown in Fig. 6 to the closed position shown in Fig. 7, thus shutting off the flow of water from the mains by stopping the flow from chamber 26 into chamber 27, which communicates with the main valve assembly through the port or passageway 12. The closing of valve 23 by means of the manual control 31 of course opens valve 25 in the manner just explained, thus permitting duct 32 to communicate with duct 24 which opens into the drain port 11, Figs. 1 and 2. When the plunger 2 is in the lower position shown in Fig. 1, the passageway 13 is normally isolated from the drain port by the solid portion of the plunger lying below the cavity 16 and by the O-ring 20, but the opening of valve 25 enables the passageway 13 to communicate with the drain through cavity 16, a portion of passageway 12, and the ducts 32 and 24. Inasmuch as the upper portion of the central bore or recess—that is, the portion 53 above the main body of the plunger—is connected to the lower port 13 by means of the tank itself and the various interconnecting pipes, the water pressure above the main portion of the plunger and within the cavity 16 will be relieved when the opening of valve 25 provides a water course to the drain. The release of this pressure, which normally tends to hold the plunger 2 in the lower position shown in Fig. 1, permits the plunger to be raised by means of knob 55 on the top end of the rod 8 that connects with the plunger. When the plunger is moved upward as far as possible, it will occupy the position shown in Fig. 2.

At any time after the closing of valve 23, the cap 54 on the top of the tank may be removed so that the rejuvenating chemicals may be placed in the tank. Cap 54 is then replaced, when the plunger has been moved to the position shown in Fig. 2, and after the new chemicals have been placed in the tank in the manner described, the valve 23 may be opened. The opening of this valve of course automatically closes valve 25 through the interconnecting mechanism hereinbefore described. The hard water entering through port 12 now flows through cavity 16 into the enlarged inner end of the outlet port 15. Most of the incoming water thus by-passes the tank and flows from port 12 through cavity 16 and out port 15 to the various places of use. Some of the water, however, flows from the chamber 22 adjoining port 15 over the top of the main body of the plunger and around the plunger's reduced upper end 10 and thence into duct 46 which connects with passageway 14. From this passageway, the water flows into pipe 53, Fig. 5, and through the tank 52 in a direction opposite from that of the normal flow. This backward flow causes the added salts to seep through and ultimately permeate the entire contents of the tank. This water flows from the bottom of the tank through pipe 51 and into port 13, entering the central bore or recess of the housing below the main body of the piston. The water then flows through the conical portion 21 of the outport 11 and into the drain.

After sufficient time has elapsed for the material in the tank to be thoroughly rejuvenated, the plunger may be restored to its normal operating position shown in Fig. 1, thus causing the water again to flow from port 12 through the valve assembly, then through the tank from bottom to top, and back again through the valve assembly via port 14, the upper portion 53 of the central bore and the outlet port 15 into the household pipes.

In order to eliminate the services of an attendant to move the valve from the upper position shown in Fig. 2 to the lower position shown in Fig. 1 after the rejuvenation period, I provide a time-controlled mechanism which cooperates with the normal water pressure to restore the plunger to the service position shown in Fig. 1. This mechanism also includes a locking means for holding the plunger in the rejuvenation position for the required length of time.

The aforementioned lock comprises a first link 56 pivoted at its lower end to a portion of the housing or to the closure member 3, which in effect becomes a part of the housing. In Figs. 1 and 2, link 56 is shown pivotally mounted to the collar or plug member 3 at point 57, which will hereinafter be referred to as a pivotal connection. A second link 58 is pivotally connected to the operating rod 8 at point 59. The two links are pivotally interconnected by pin 64, this pivoted interconnection acting as an elbow. A projection or abutment 60, Figs. 1 to 4, is provided on one or other of these links. This abutment 60 is shown as being integral with the upper link 58, but the mechanism would operate equally well if the abutment were integral with the other link. A torsion spring 61 urges the links to the over-center position shown in Fig. 2, where further movement of the pivot point 64 toward the right is prevented by the engagement of abutment 60 with the left edge of the lower link 56, as shown in Fig. 2. In this over-center position of these links, it will be observed that the axis of the pivotal point 64 where the links are interconnected lies to the right of an imaginary straight line drawn through the axes of the pivotal connections 59 and 57. The axis of the connection 64 thus lies between the said imaginary line and the axis of shaft 62 of the cam 63.

When the plunger is in its upper or regeneration position, the pressure of the water above the main portion of the plunger and in the cavity 16 will tend to move the plunger downward to the service position shown in Fig. 1, but the illustrated over-center position of the links will prevent such movement. The shaft 62 of cam 63 is connected to the timing mechanism 65. At the beginning of the regeneration period, the timer is turned to an angular position that places cam 63 in the orientation shown in Fig. 2. The timer is designed or adjusted so that cam 63 will turn from the angular position shown in Fig. 2 to the angular position shown in Fig. 3 within the time period required for the rejuvenation of the chemicals in the tank. When the timer has turned to the Fig. 3 position, the outwardly extending periphery of the cam will have engaged the abutment 60 on link 58 and moved it to the position shown in Fig. 3. The elbow connection of the two links will thus be free to move to the left, permitting the plunger to move down under the water pressure until it ultimately reaches the service position shown in Fig. 1. In this position of the plunger, the resilient O-ring 20 will close the drain port 11, and the cavity will be so disposed with relation to ports 12 and 13 that water may flow from the former port to the latter through the cavity, and, after traversing the tank from bottom to top, proceed across the plunger from port 14 to 15 and thence to the household lines.

In the arrangement shown in the figures, the collapse of the aforementioned link system under pressure of the water in the housing, was prevented by the engagement of abutment 60 and the left edge of the lower link 56, It is, of course, possible to so position the cam with respect to the abutment that the cam itself will serve to limit the movement of abutment 60 toward the right. Either of these alternative arrangements, as well as any other that will serve the same purpose, is contemplated in my design.

Figure 8:
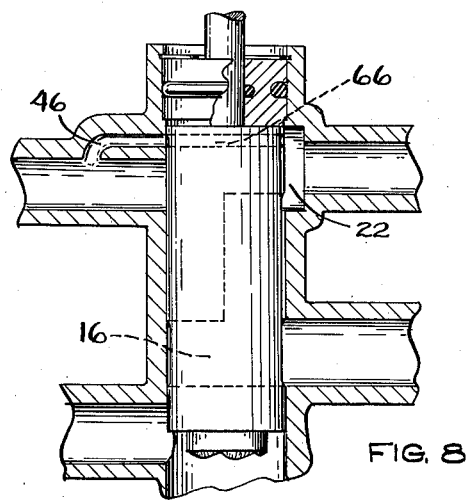
Fig. 8 shows a modification of a portion of a combination valve and timer assembly in which a different piston structure permits the flow of water from one port to another by means of a channel passing through the piston rather than over the top portion of the main body of the piston as in the structure illustrated in Figs. 1 and 2.

Fig. 8 shows an alternative construction for the top portion of the plunger. In Fig. 2, the top of the plunger 2 has a reduced portion 10 to permit communication between the chamber 22 at the inner end of the passageway 15 and the duct 46 to permit rinse water to flow in a reverse direction through the tank. Instead of forming the plunger with a reduced portion 10, the same purpose may be served by providing the upper end of the plunger with a channel or duct so located that it will substantially register with the inner end of the duct 46 and with some portion of the chamber 22. Water may then flow from the upper portion of the cavity 16 into the chamber 22 and thence through the channel 66 into duct 46.

Many other modifications may be made from the specific structures shown in the drawings for illustrative purposes, and various parts may be combined, altered, reversed or replaced by substitute parts performing the same functions without departing from the broad spirit of my invention as set forth in the appended claims.

My claims are:

1. A valve and timer combination for use with a water softener comprising a softener tank, said combination including: a main body housing having a recess therein to slidably receive a piston; a first passageway in said housing; second and third passageways in said housing; a fourth passageway in said housing to permit the outflow of water from said recess; a piston mounted for translational movement within said recess, said piston being constructed and arranged so that in a first operative position thereof water may flow through said third passageway into said recess and after traversing said piston leave the housing through said fourth passageway, said piston constructed with a cavity so disposed therein that when the piston is in said first position water may flow from said first passageway through the cavity and out the second passageway and when the piston is in a second operative position water may flow from said first passageway through the cavity and out said fourth passageway; a rod connected to said piston and extending in longitudinal alignment therewith to the outside of said housing; a journal for said rod; said recess and the end of the piston closest to said journal being so constructed and arranged with respect to each other that when said piston is in said second position there will be a water chamber beyond said end of said piston that will communicate with said fourth passageway and said cavity; releasable means connected to said rod for holding said piston in said second position; and time-controlled means for releasing said releasable means to permit said piston to return to said first position in response to the pressure of the water in said chamber upon said end of the piston closest to said journal.

2. A valve and timer combination comprising: a main body housing having a cylindrical recess therein to slidably receive a piston; a first passageway in said housing for admitting fluid to said recess; first and second outlet ports in said housing; a rod extending through said housing; a piston attached to said rod, said piston acting in a first position thereof to block the flow of fluid from said passageway to one of said ports and in a second position thereof to block the flow of fluid from said passageway to the other of said ports; said recess and piston so shaped and disposed with respect to each other that a chamber is always present between the main body of the piston and the portion of the housing through which the rod extends; a first link pivotally connected at one end to said housing; a second link pivotally connected at one end to said rod, said second link pivotally attached to said first link to form a movable elbow connection therewith; a rotatable cam so constructed and so located with relation to said elbow connection that when said cam is in certain angular positions and said piston is in said first position the said elbow connection will be free to move toward said cam to a locking position in which said links will releasably hold said piston in said second position; means for stopping the movement of said elbow connection toward said cam substantially at said locking position, said means comprising an abutment on one of said links near said elbow connection; a spring for urging said elbow connection toward said locking position; said cam acting in certain other angular positions thereof to press against said abutment and move said elbow connection to a releasing position in which said links will permit the piston to return to its first position in response to the pressure of fluid between said piston and the portion of the housing through which the rod extends.

3. A valve combination for use with a water softener comprising a softener tank, said combination including: a main body housing having a recess therein to slidably receive a piston; a first passageway in said housing for admitting water into said recess; second and third passageways in said housing; a fourth passageway in said housing to permit the outflow of water from said recess; a duct extending through said housing from a side of said recess near one end thereof to said third passageway; a drain port in said housing; a piston mounted for translation movement within said recess and so disposed therein that in one operative position of the piston its main body is out of the path of water flowing from said third passageway to said fourth passageway but in the path of water that would otherwise flow from said second passageway to said drain port; said piston having a single cavity therein comprising (a) a channel extending part way along one side of the piston and (b) a canal communicating with the channel and extending laterally of the piston, said channel and said canal so disposed that in said one operative position of the piston water may flow from said first passageway through the channel and thence through said canal into said second passageway, and so that when the piston is in a second operative position water may flow from said first passageway through said channel and into said fourth passageway only; said piston having a portion of reduced diameter at one end so that when the piston is in said second operative position water entering said fourth passageway from said channel may flow around said portion into said duct while the main body of the plunger blocks said third passageway.

4. A valve combination for use with a water softener comprising a softener tank, said combination including: a main body housing having a recess therein to slidably receive a piston; a first passageway in said housing for admitting water into said recess; second and third passageways in said housing; a fourth passageway in said housing to permit the outflow of water from said recess; a duct extending through said housing from a side of said recess near one end thereof to said third passageway; a drain port in said housing; a piston mounted for translational movement within said recess and so disposed therein that in one operative position of the piston its main body is out of the path of water flowing from said third passageway to said fourth passageway but in the path of water that would otherwise flow from said second passageway to said drain port; said piston having a single cavity therein comprising (a) a channel extending part way along one side of the piston and (b) a canal communicating with the channel and extending laterally of the piston, said channel and said canal so disposed that in said one operative position of the piston water may flow from said first passageway through the channel and thence through said canal into said second passageway, and so that when the piston is in a second operative position water may flow from said first passageway through said channel and into said fourth passageway only; said piston having a portion of reduced diameter at one end so that when the piston is in said second operative position water entering said fourth passageway from said channel may flow around said portion into said duct while the main body of the plunger blocks said third passageway; a rod connected to said piston and extending in longitudinal alignment therewith to the outside of said housing; a first link pivotally connected at one end to said housing; a second link pivotally connected at one end to said rod, said second link pivotally attached to said first link to form a movable elbow connection therewith; an abutment on one of said links near said elbow connection; a rotatable cam so constructed and so located with relation to said elbow connection that when said piston is in said one operative position a portion of the cam will adjoin said abutment; and a spring for urging said abutment toward said cam to a locking position in which said links will releasably hold said piston in said second operative position; said cam acting in certain angular positions thereof to press against said abutment and move it to a releasing position in which said links will no longer hold said piston in said second operative position, but will permit it to be moved to said one operative position by the pressure of the water against the main body of the plunger as it flows around the reduced end portion of the plunger.

5. A valve and timer combination for use with a water softener comprising a softener tank, said combination including: a main body housing having a recess therein to slidably receive a piston; a first passageway in said housing for admitting water into said recess; second and third passageways in said housing; a fourth passageway in said housing to permit the outflow of water from said recess; a duct extending through said housing from a side of said recess near one end thereof to said third passageway; a drain port in said housing; a piston mounted for translational movement within said recess and so disposed therein that in one operative position of the piston its main body is out of the path of water flowing from said third passageway to said fourth passageway but in the path of water that would otherwise flow from said second passageway to said drain port; said piston having a single cavity therein comprising (a) a channel extending part way along one side of the piston and (b) a canal communicating with the channel and extending laterally of the piston, said channel and said canal so disposed that in said one operative position of the piston water may flow from said first passageway through the channel and thence through said canal into said second passageway, and so that when the piston is in a second operative position water may flow from said first passageway through said channel and into said fourth passageway only; said piston having a portion of reduced diameter at one end so that when the piston is in said second operative position water entering said fourth passageway from said channel may flow around said portion into said duct while the main body of the plunger blocks said third passageway; a rod connected to said piston and extending in longitudinal alignment therewith to the outside of said housing; a first link pivotally connected at one end to said housing; a second link pivotally connected at one end to said rod, said second link pivotally attached to said first link to form a movable elbow connection therewith; an abutment on one of said links near said elbow connection; a rotatable cam so constructed and so located with relation to said elbow connection that when said piston is in said one operative position a portion of the cam will adjoin said abutment; a spring for urging said abutment toward said cam to a locking position in which said links will releasably hold said piston in said second operating position; said cam acting in certain angular positions thereof to press against said abutment and move it to a releasing position in which said links will no longer hold said piston in said second position; driving means for rotating said cam; and means for so controlling said driving means that said cam will effect the movement of said abutment from said locking position to said releasing position in a pre-selected interval of time.

References Cited in the file of this patent
UNITED STATES PATENTS

| | | |
|---|---|---|
| 1,707,692 | Ter Beest | Apr. 2, 1929 |
| 1,878,019 | Stickney | Sept. 20, 1932 |
| 2,003,739 | Clark | June 4, 1935 |
| 2,048,607 | Griffey | July 21, 1936 |
| 2,052,515 | Pick | Aug. 25, 1936 |
| 2,311,108 | Hauser | Feb. 16, 1943 |
| 2,338,804 | Drane | Jan. 11, 1944 |
| 2,507,343 | Lindsay et al. | May 9, 1950 |
| 2,564,066 | Jordan | Aug. 14, 1951 |
| 2,636,560 | Rogers | Apr. 28, 1953 |
| 2,719,538 | Cole et al. | Oct. 4, 1955 |
| 2,726,717 | Strobel | Dec. 13, 1955 |
| 2,754,263 | Spaulding et al. | July 10, 1956 |